(12) United States Patent
Farwell (10) Patent No.: US 7,739,034 B2
(45) Date of Patent: Jun. 15, 2010

(54) LANDMARK NAVIGATION FOR VEHICLES USING BLINKING OPTICAL BEACONS

(75) Inventor: Mark Lalon Farwell, Colorado Springs, CO (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 697 days.

(21) Appl. No.: 11/736,042

(22) Filed: Apr. 17, 2007

(65) Prior Publication Data

US 2008/0262718 A1    Oct. 23, 2008

(51) Int. Cl.
*G01C 21/00* (2006.01)
(52) U.S. Cl. ...................................................... 701/207
(58) Field of Classification Search ................... 701/207
See application file for complete search history.

(56) References Cited

U.S. PATENT DOCUMENTS

| | | | | |
|---|---|---|---|---|
| 4,424,943 A * | 1/1984 | Zwirn et al. | ................ | 244/3.11 |
| 4,786,167 A * | 11/1988 | Rothbone et al. | ........ | 356/141.5 |
| 5,396,243 A * | 3/1995 | Jalink et al. | .................... | 342/54 |
| 5,920,394 A * | 7/1999 | Gelbart et al. | .............. | 356/615 |
| 5,974,348 A * | 10/1999 | Rocks | ......................... | 701/28 |
| 6,654,482 B1 * | 11/2003 | Parent et al. | ................ | 382/104 |
| 6,859,729 B2 | 2/2005 | Breakfield et al. | | |
| 2004/0168148 A1 * | 8/2004 | Goncalves et al. | .......... | 717/104 |
| 2004/0182925 A1 * | 9/2004 | Anderson et al. | ........... | 235/385 |
| 2007/0276590 A1 * | 11/2007 | Leonard et al. | ............. | 701/207 |

OTHER PUBLICATIONS

"Camera Module Adopts Full-Circle 360° Lens to Open New Markets".
Tao Wang et al., "Landmark Navigation for Robot Using Vision Tech", Dec. 2003.
Greg Duckworth, "GPS-Free Navigation".
J. Borenstein et al., "Where Am I? Sensors and Methods for Mobile Robot Positioning", Apr. 1996 pp. 151-217.

* cited by examiner

*Primary Examiner*—Thomas G Black
*Assistant Examiner*—Shelley Chen
(74) *Attorney, Agent, or Firm*—Edell, Shapiro & Finnan, LLC (57) ABSTRACT

A system and method for landmark navigation employing optical beacons deployed at locations throughout a field of operation of a vehicle. The optical beacons emit or reflect an optical signal at a predetermined blink frequency. The locations of the optical beacons may or may not be known to the vehicle. At least one imaging device on the vehicle, such as a digital camera, captures images in the field of operation, and in particular a pair of image frames such that the time interval between the image frames of the pair is equal to one-half of the blink period of the optical signal. Data is generated that represents a difference frame between two image frames captured by the imaging device. Pixel locations of optical beacons in the difference frame are identified. The position and orientation of the vehicle is determined from data representing pixel locations of optical beacons in the difference frame.

26 Claims, 9 Drawing Sheets

LANDMARK NAVIGATION FOR VEHICLES USING BLINKING OPTICAL BEACONS

BACKGROUND OF THE INVENTION

The present invention is directed to positioning and navigation systems.

Positioning and navigation systems are used in a wide range of applications. One particular application that presents unique challenges is in connection with robots or unmanned vehicles. Currently, a global positioning system (GPS) is virtually the only technique used for robot positioning in outdoor applications. Developments in this field have been made to accommodate the accuracy and limitations of GPS. When GPS capability is denied due to signal reception difficulties, then these devices turn to inertial navigation system (INS) techniques. A GPS/INS positioning system is expensive and achieves precise navigation only when a significant view of the GPS satellites exists from time to time. Moreover, it is still necessary to employ a source of differential GPS correction data from a radio transmitter station in communication with the vehicle. Furthermore, INS systems accrue error as a function of time because they use acceleration sensors to calculate position displacement through integration. Therefore, every minute that a GPS/INS-based system does not see enough sky to cancel out the INS error, the position accuracy of the vehicle continues to worsen.

Dead reckoning is a technique used to update position during periods of "blackout" of the absolute positioning system (e.g., GPS). This may be achieved by sensing the relative movement of the vehicle as it moves about. INS techniques may be used to determine relative movement, but odometry is often used instead of INS for dead reckoning. The sources of error with odometry are the uncertainty in the direction of motion at any instant and slippage of the vehicle's wheels on the terrain. Dead reckoning error is commonly specified as percent error versus distance traveled and two percent dead reckoning error is considered very good. Thus, for applications that require very precise positioning determinations, it is not tolerable to have blackouts in the absolute positioning system.

Numerous positioning system approaches are known that attempt to provide accurate mobile robot positioning without the use of GPS. These approaches include GPS-pseudolite transmitters, RF beacons, ultrasonic positioning, active beam scanning and landmark navigation. In particular, a landmark navigation system uses a sensor, usually a camera, to determine a vehicle's position and orientation with respect to artificial or natural landmarks. Artificial landmarks may be deployed at known locations and in current systems heretofore known take the form of a high contrast bar code or dot pattern. A sensor device can observe both the orientation and distance to the landmark so that only two landmarks need to be viewed in order to compute the vehicle's position. The challenge in a landmark navigation system is in reliably identifying the landmarks in cluttered scenes. The accuracy of the position computation is dependent on accurately determining the camera orientation to the landmark. Also, sufficient illumination is necessary with existing landmark navigation solutions.

Nevertheless, landmark navigation is attractive because of its potential for accuracy, high reliability, low cost and relative ease of deployment. There is, therefore, a need for an improved landmark navigation positioning system that can achieve the reliability and accuracy that current positioning system solutions for robotic or unmanned vehicles cannot.

SUMMARY OF THE INVENTION

Briefly, the present invention is directed to a system and method for landmark navigation that is much less expensive and complex to deploy than systems heretofore known. According to the present invention, optical beacons are deployed at locations throughout a field of operation of a vehicle. The optical beacons emit or reflect an optical signal at a predetermined blink frequency. The locations of the optical beacons may or may not be known to the vehicle. There is at least one imaging device on the vehicle, such as a digital camera, to capture images in the field of operation, and in particular a pair of image frames such that the time interval between the image frames of the pair is equal to one-half of the blink period of the optical signal. Data is generated that represents a difference frame between two image frames captured by the imaging device. Pixel locations of optical beacons in the difference frame are identified. The position and orientation of the vehicle is determined from data representing pixel locations of optical beacons in the difference frame.

When positions for one or more optical beacons are known, data representing those positions are stored in the vehicle and used to match or associate pixel locations of beacons to actual optical beacons for purposes of the position and orientation computations. However, the position of an optical beacon may be self-surveyed and thus determined by the vehicle using data accumulated over time for views of the optical beacon captured by the vehicle at different locations in the field of operation. The vehicle may have other positioning systems that it can use to determine its position or orientation in the field of operation, and thus the optical beacon positioning techniques of the present invention may augment those other positioning systems.

DETAILED DESCRIPTION

Figure 1:
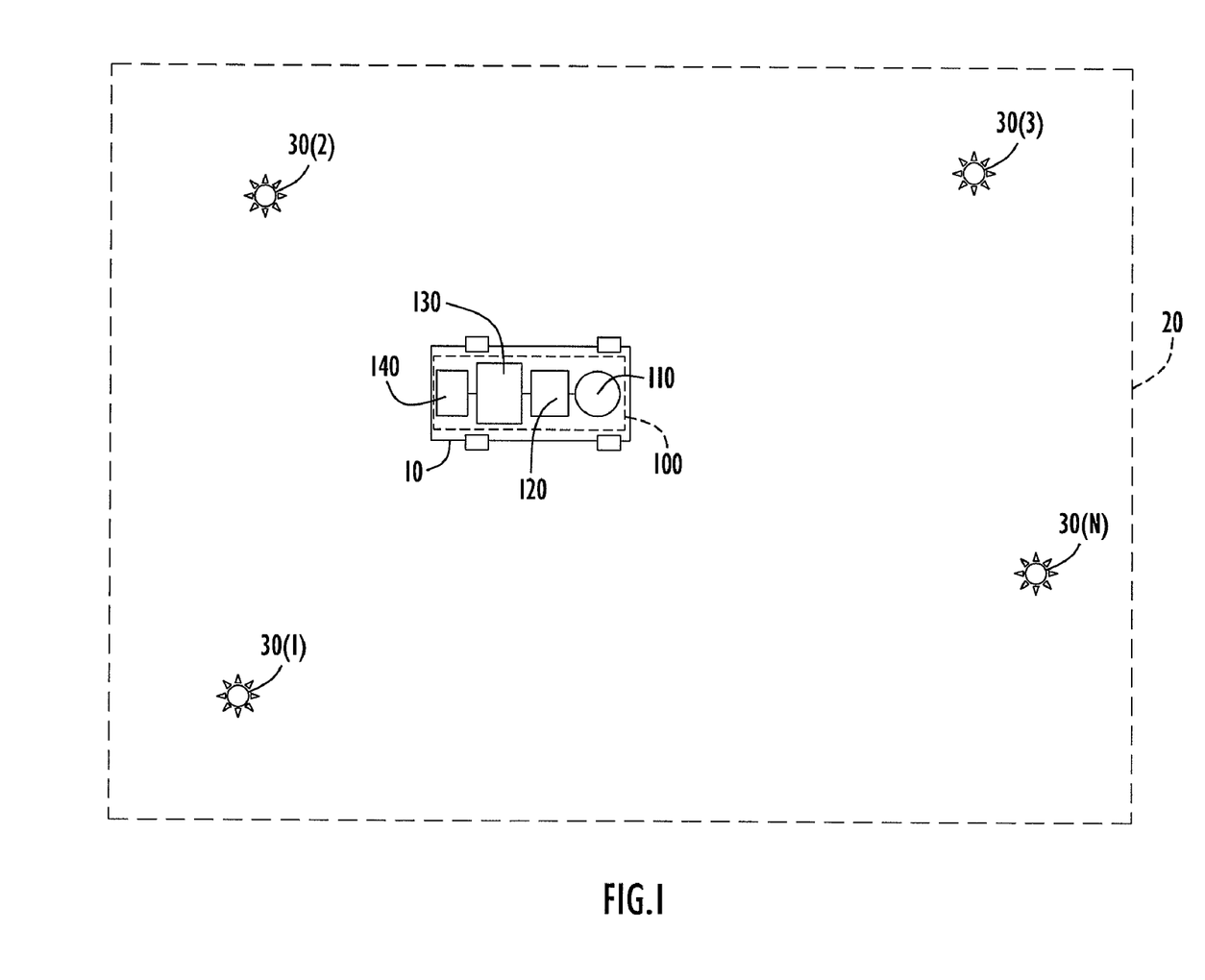
FIG. 1 is diagram showing a vehicle within a field of operation in which optical beacons are placed for the landmark navigation according to the embodiments of the present invention.

Referring first to FIG. 1, a vehicle is shown at reference numeral 10 that moves about within a field of operation shown at reference numeral 20. The vehicle may be a robotic self-controlled vehicle, or a remotely controlled vehicle, or any other vehicle on which it is desired to have navigation capabilities. The field of operation 20 may be a room inside a building, an entire building, an outdoor region such as a town or city, etc. Positioned throughout the field of operation 20 are optical beacons 30(1) to 30(N). In one embodiment, the positions or locations of the optical beacons 30(1) to 30(N) are known a priori or otherwise determined prior to deployment of a vehicle 20 in the field of operation. In another embodiment, the vehicle 20 determines the positions of the optical beacons by way of a self-surveying technique described hereinafter. The optical beacons may be positioned on the ceiling of a room or building or on a vertical structure (e.g., wall) for indoor applications. For outdoor applications, the optical beacons may be positioned on vertical structures such as exterior building walls, or other vertical structures. The optical beacons 30(1) to 30(N) either emit or reflect light at a predetermined blink frequency, as described in further detail hereinafter in conjunction with FIG. 3.

Figure 2:
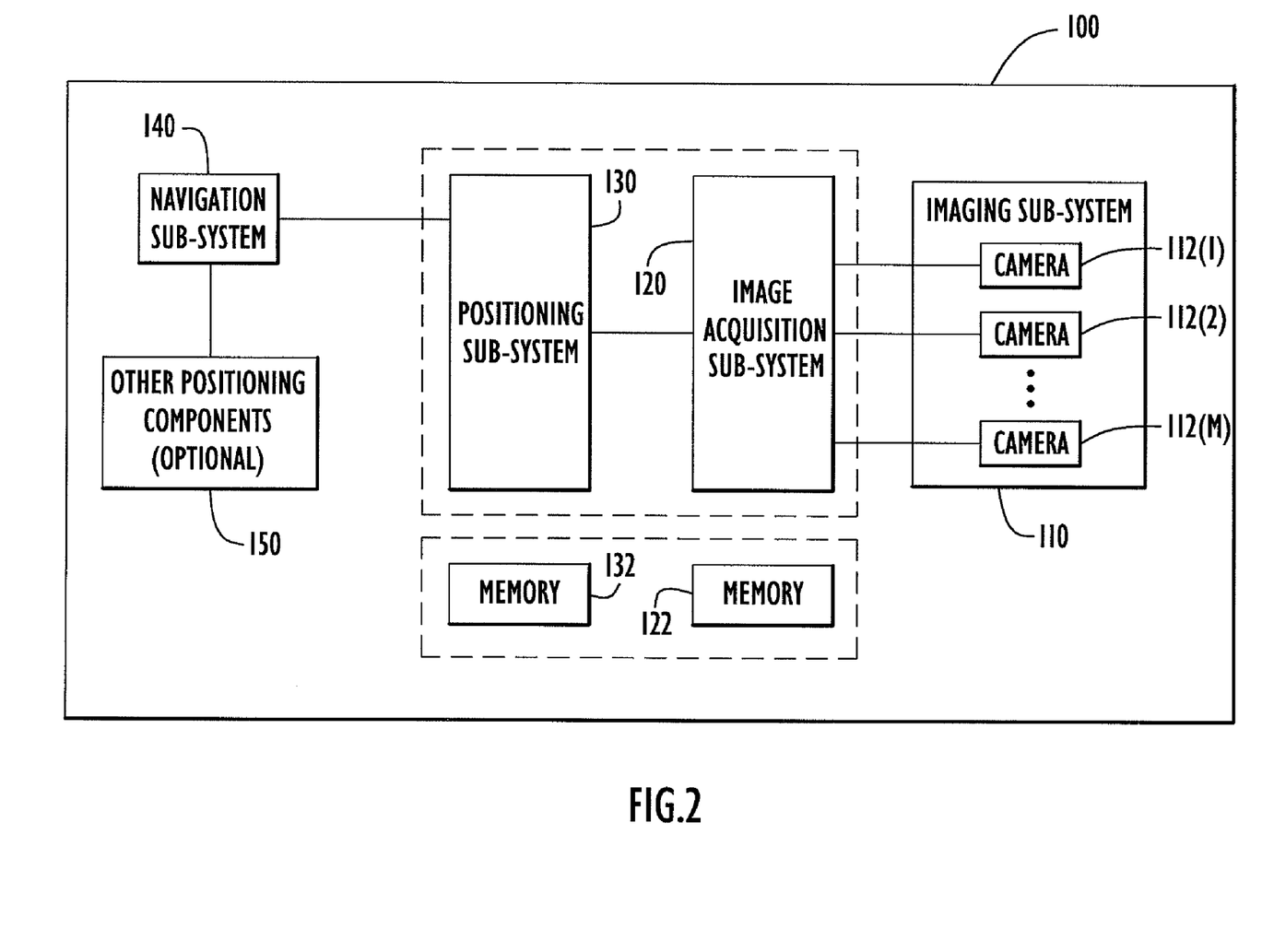
FIG. 2 is a block diagram of the components on a vehicle that performs the landmark navigation techniques according to one embodiment of the present invention.

Turning to FIG. 2 with continued reference to FIG. 1, the vehicle-mounted system comprises at least one imaging sub-system (e.g., camera) 110, an image acquisition sub-system 120, a positioning sub-system 130 and a navigation sub-system 140. In addition, the system 100 may comprise other positioning equipment or components shown at 150, such as a global positioning system (GPS) receiver, an inertial navigation system (INS) positioning device, light direction and ranging (LIDAR) sensor, etc. Data storage memory units 122 and 132 are provided for use by the image acquisition sub-system and the positioning sub-system, respectively. The image acquisition sub-system 120 and the positioning sub-system 130 may be separate units, each comprising a data processing component such as a computer, microprocessor, application specific integrated circuit, etc., that executes signal processing algorithms embodied by computer program instructions stored in a computer readable medium, or embodied by firmware as the case may be. The memory 122 is for storing image data obtained by the imaging sub-system 110 and as working memory for the processing functions of the image acquisition sub-system 120. Similarly, the memory 132 is for storing position data for the plurality of optical beacons 30(1) to 30(N), as well as data for the blink frequency (or period) of the optical beacons. The memory 132 is also used as a working memory for storing data used in the position computations described hereinafter.

It should be understood that functions of the image sub-system 120 and positioning sub-system 130 may be performed by a single data computing, processing or controller unit. Likewise, the memories 122 and 132 may be a single memory unit for storing image data, beacon light source position data, and other working data in connection with the position computations that are described hereinafter.

The imaging sub-system 110 comprises one or more imaging devices, e.g., digital cameras, 112(1) to 112(M). The cameras 112(1) to 112(M) may be mounted in a fixed orientation on the vehicle or can be mounted on an actively slewing structure. The positioning sub-system 130 is programmed with the orientation, relative to the vehicle, of the cameras 112(1) to 112(M). For actively slewing cameras, the positioning sub-system is programmed with the range of motion of the camera and is supplied with a signal from the slewing mechanism to allow the positioning sub-system 130 to track the orientation of each camera relative to the vehicle at the instants image frames are obtained. When using a slewing camera, it is desirable to have the slew mechanism pause during the frame acquisition intervals.

The field of view of the cameras 112(1) to 112(M) are aligned to see as many optical beacons as possible at any one moment because a better position calculation can be made when data for more optical beacons are captured in the image frames. When, for example, the field of operation is indoors and it is known that the optical beacons are positioned on the ceilings of an indoor structure, one or two conventional digital cameras with a relatively wide field-of-view lens (e.g., 60 degrees) oriented upwards is sufficient. When the optical beacons are positioned on vertical structures (in an indoor or outdoor application), then six cameras, each with a 60 degree field-of-view, provides a full 360 degree view so as to capture all optical beacons. Alternatively, three cameras each having a 180 degree field of view may be sufficient as well. Still another alternative is to use a single camera with a 360 degree panoramic lens, wherein software in the image acquisition sub-system 120 is provided to map out the distortion of a panoramic lens. For example, Sony Corporation has developed a camera module that uses a 360° full-circle lens and has a built-in panorama expansion processing function.

The image acquisition sub-system 120 controls the timing of the image acquisition by the imaging sub-system 110 so that each camera captures a pair of image frames separated in time from each other by a time interval that is precisely one-half of the blinking period of light emitted or reflected by the optical beacons. The image acquisition sub-system 120 stores the digital data for pairs of image frames, and as described hereinafter, computes a difference image between the frames in each pair, in order to identify from the digital pixel data pixels corresponding to optical beacons. The pixel data for identified optical beacons in the difference frame is supplied to the positioning sub-system 130 for use in the position computations described hereinafter.

The positioning sub-system 130 computes the position and orientation of the vehicle at each position update cycle based on the pixel data for identified optical beacons in difference frames. The positioning sub-system 130 supplies the position data to a navigation sub-system 140 that uses the position information to generate velocity and direction controls to the vehicle's motor and steering mechanisms.

Figure 3:
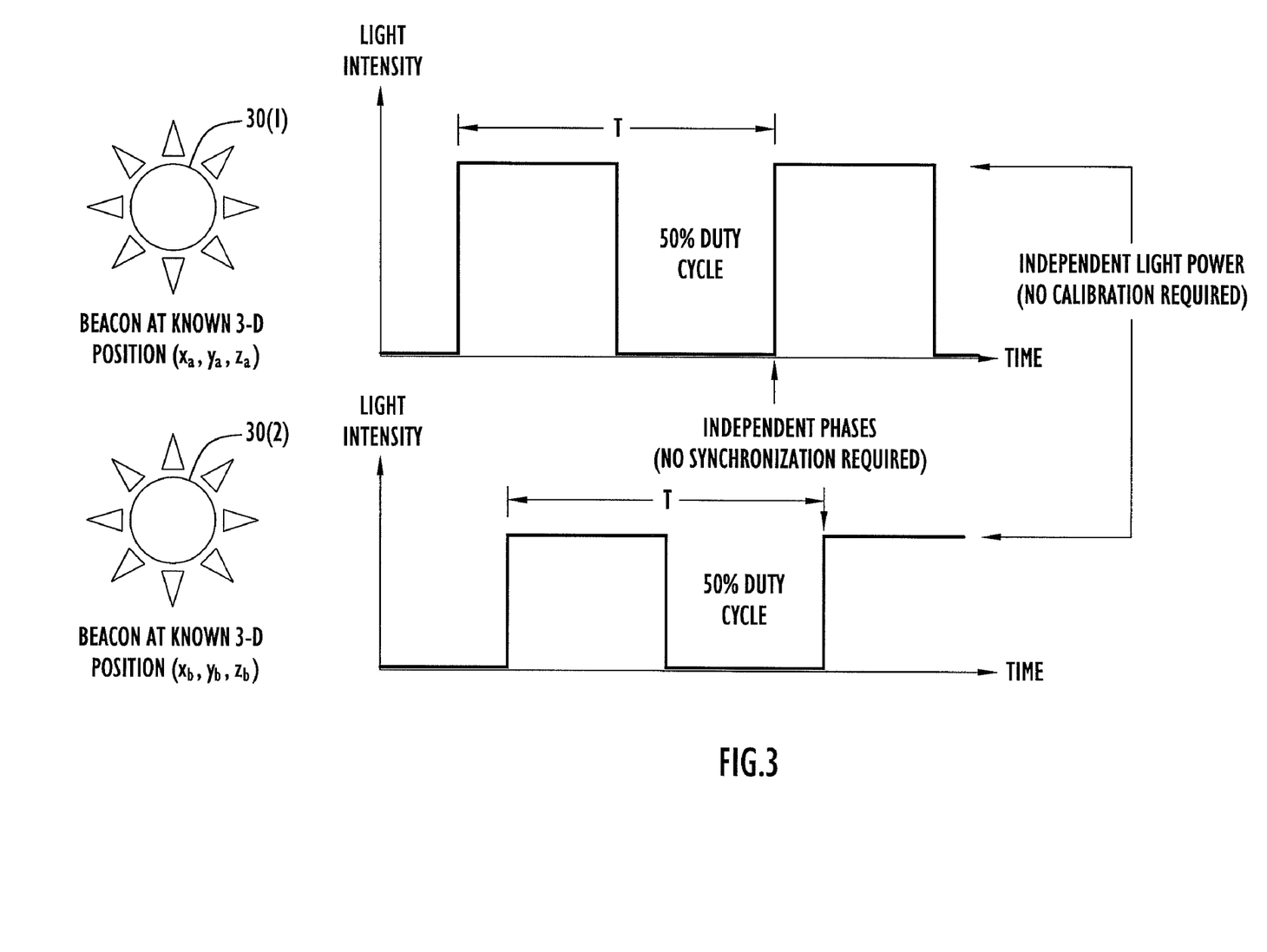
FIG. 3 illustrates timing of optical signals emitted or reflected by optical beacons in accordance with embodiments of the present invention.

Turning to FIG. 3, the optical beacons are described in more detail. FIG. 3 shows two optical beacons 30(1) and 30(2) and the timing of light emitted by them. Beacons 30(1) and 30(2) are active beacons because they contain the light source that emits light to be detected by a camera on the vehicle. In one embodiment, each optical beacon comprises a light source that blinks at the same frequency ($f=1/T$, where T is the blink period) with a 50% duty cycle. The light sources across optical beacons need not be synchronized as shown in FIG. 3, nor is it necessary to calibrate the power of the light sources of the optical beacons. In one example, the frequency f of the light sources of the optical beacons is 10 Hz. The light source may be any light source that can be operated to blink at a controlled frequency. The light produced by the beacon sources needs to be detectable by the cameras used in the imaging sub-system. For example, and not by way of limitation, the light sources may be infra-red light emitting diodes (LEDs) that produce infra-red light that is invisible to the naked eye of a human. Power for the light sources of the optical beacons may be from a battery, a solar panel and storage cell or conventional wall power supply obtained from a building or structure.

Beacon 30(1) is at a known position defined by coordinates ($x_a, y_a, z_a$) and beacon 30(2) is at a known positioned defined by coordinates ($x_b, y_b, z_b$). As mentioned above, data describing the position of each of the optical beacons in the field of operation are stored in the vehicle in what may be referred to herein as a beacon database.

Figure 4:
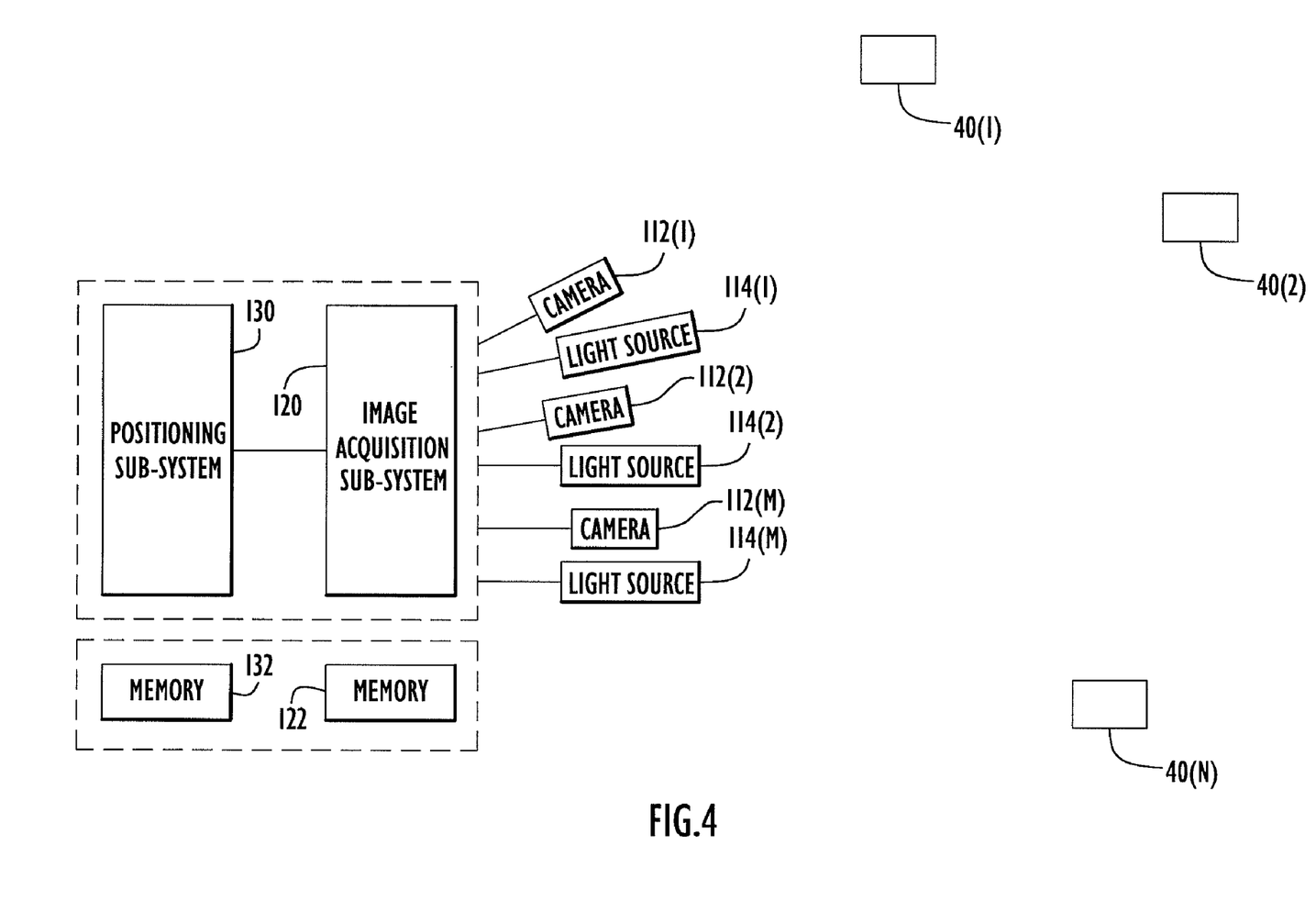
FIG. 4 is a bock diagram of the vehicle components according to an embodiment of the present invention involving the use of passive optical beacons.

In another embodiment, the optical beacons are passive beacons and one or more light sources are mounted on the vehicle itself to illuminate the optical beacons. This embodiment is now described in connection with FIG. 4. Passive optical beacons shown at 40(1) to 40(N) are deployed as the optical beacons instead of the active blinking optical beacons 30(1) to 30(N) shown in FIG. 1. In this case, the vehicle has a blinking light source (visible or invisible to humans) that illuminates the reflector beacons. For example, each camera 112(1) to 112(M) may have a dedicated light source 114(1) to 114(M). Each light source may have an illumination pattern that matches the field-of-view of the corresponding camera. However, this is not required and multiple cameras may operate with respect to the same light source. All other components and functions of the system and method described above are the same.

Each vehicle-based light source 114(M) to 114(M) blinks at a fixed frequency and with a 50% duty cycle as shown in FIG. 3. The light sources 114(1) to 114(M) may be on continuously to emit the blinking light into the field of operation, or they be activated only when needed shortly and through a position update cycle. The passive optical beacons may employ standard passive "corner" reflector technology. As is known in the art, a corner reflector (also known as a "corner cube") is a retroreflector (returns light to the source regardless of angle of incidence) consisting of three mutually perpendicular, intersecting flat surfaces that reflects electromagnetic waves back towards the source. An advantage of this alternative is that the beacons are merely mechanical structures that do not require power or electronics. Moreover, since some structures in the field of operation may serve as inherent reflector devices, it may be possible to use those existing structures (whose locations are known or can easily be determined) as reflector beacons.

Figure 5:
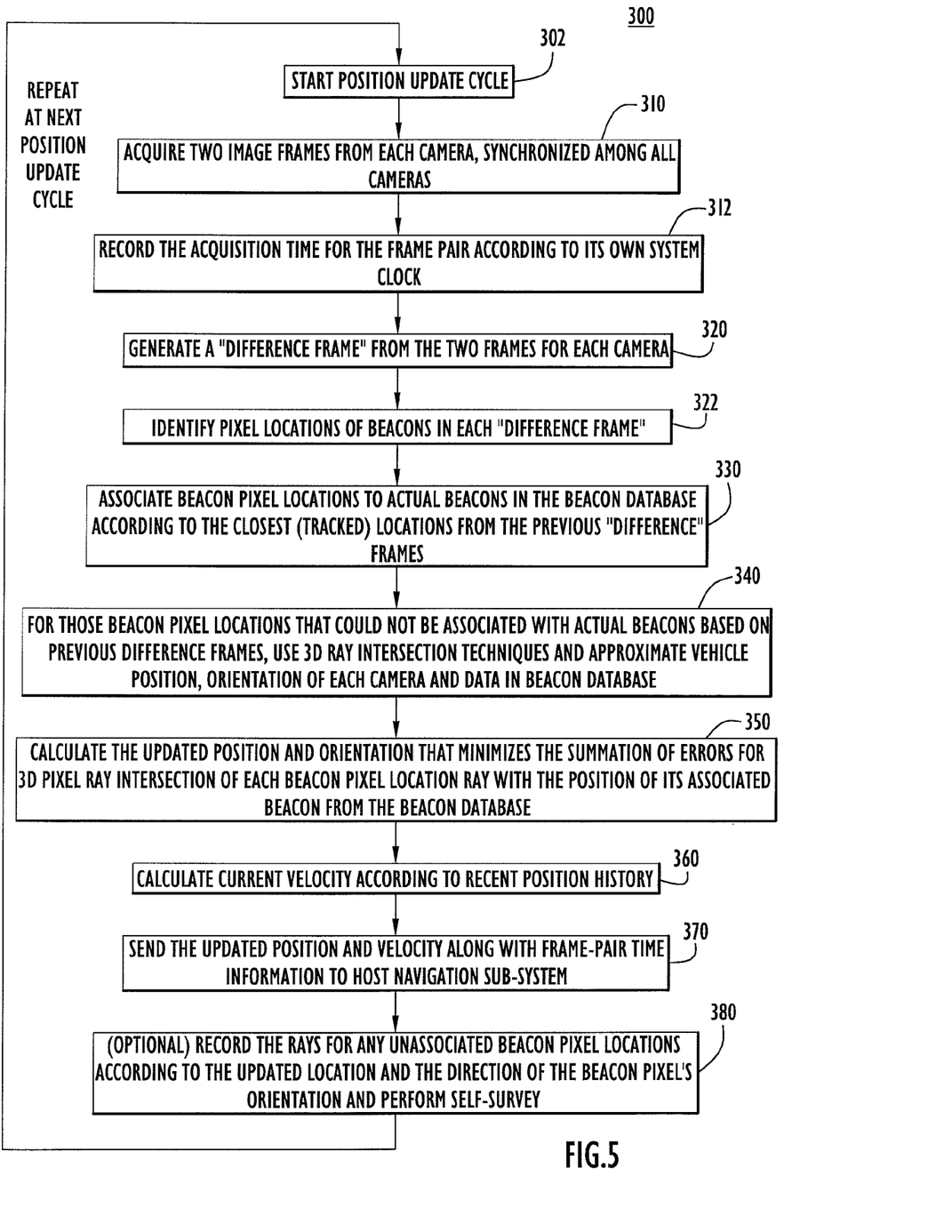
FIG. 5 is a flow chart of the positioning methodology according to an embodiment of the present invention.
Figure 6A:
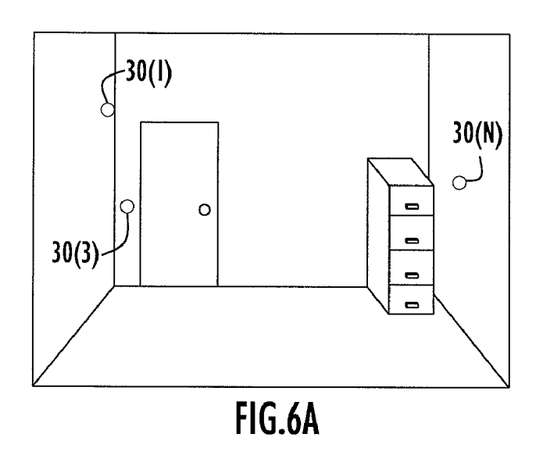
FIGS. 6A and 6B are image frames that are captured by an imaging device on the vehicle and are provided for purposes of explanation operation of the navigation methodology of the present invention.
Figure 6B:
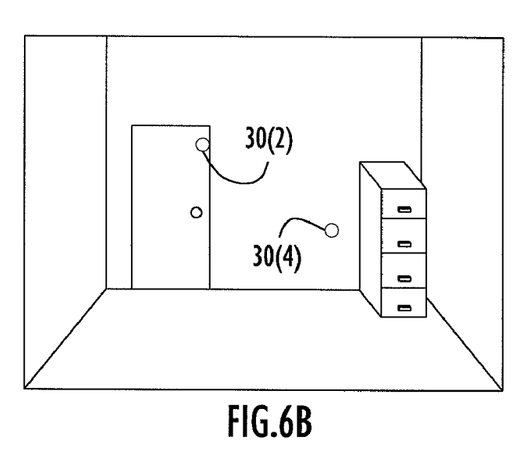

Turning to FIG. 5, a process 300 for deriving the vehicle position (performed by the components shown in FIG. 2 that are on or in the vehicle) is now described. The process 300 is the same whether active optical beacons or passive optical beacons, or a combination, are used. The process 300 is performed at each position update cycle, and begins at 302. At 310, each camera is controlled to obtained a pair of image frames, where the image frames are captured with a time interval separated them that is exactly one-half the blink period T. This ensures that one frame will be acquired while a given light source (of an active optical beacon or on the vehicle incident on a passive optical beacon) is on and the other frame will be acquired while a given light source is off. Moreover, if multiple cameras are used, then all of the cameras are synchronized as to when they are triggered to capture an image. At 312, the instants in time that each image frame (in the pair of image frames) is acquired by each camera are recorded by the image acquisition sub-system according to its own clock. FIGS. 6A and 6B illustrate two exemplary images acquired by a camera, separated in time by exactly one-half the blink period T, where some beacon light sources are captured in each image frame of the pair. For example, the image frame in FIG. 6A captured beacon light sources 30(1), 30(3) and 30(N), and the image frame in FIG. 6B captured beacon light sources 30(2) and 30(4).

Next, at 320, the image acquisition sub-system generates a "difference" frame by subtracting one image frame from the other image frame to thereby produce an image frame that contains pixels corresponding to only the optical beacons (above some threshold to account for background noise). In addition, in order to account for possible motion occurring between the two image frames of a pair, image decimation may be employed to set groups of pixels to maximum values. Such a technique can help overcome the slight misalignment of the two images by insuring that the brighter, non-beacon features in the images overlap and thus are eliminated during the two-frame subtraction. Alternatively, imaging may be performed when the vehicle is stationary. Still another alternative is to use a very fast blink frequency or to perform imaging along the axis of motion of the vehicle. An optical frequency filter on the camera lens tuned to the optical frequency of the light source may have the additional benefit of reducing motion edge effects.

Figure 7:
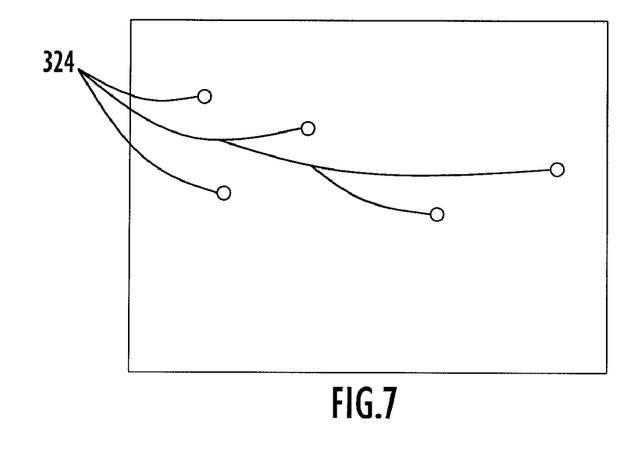
FIG. 7 is an image frame derived from a difference frame generated from the image frames shown in FIGS. 6A and 6B, and showing pixels corresponding to the optical beacons captured by an imaging device on the vehicle.

At 322, the difference frame is analyzed to identify pixel locations of optical beacons (active or passive) using image thresholding, such as binary thresholding well known in the art. FIG. 7 illustrates a binary threshold image derived from the result of subtracting one of the image frames shown in FIGS. 6A and 6B from the other image frame. The dots 324 shown in FIG. 7 are the beacon image pixels that correspond to light sources 30(1) to 30(N) in the field of view shown in FIGS. 6A and 6B. If multiple cameras are used on the vehicle, then the pixel locations of beacons in each of the resulting difference frames are identified.

Figure 8:
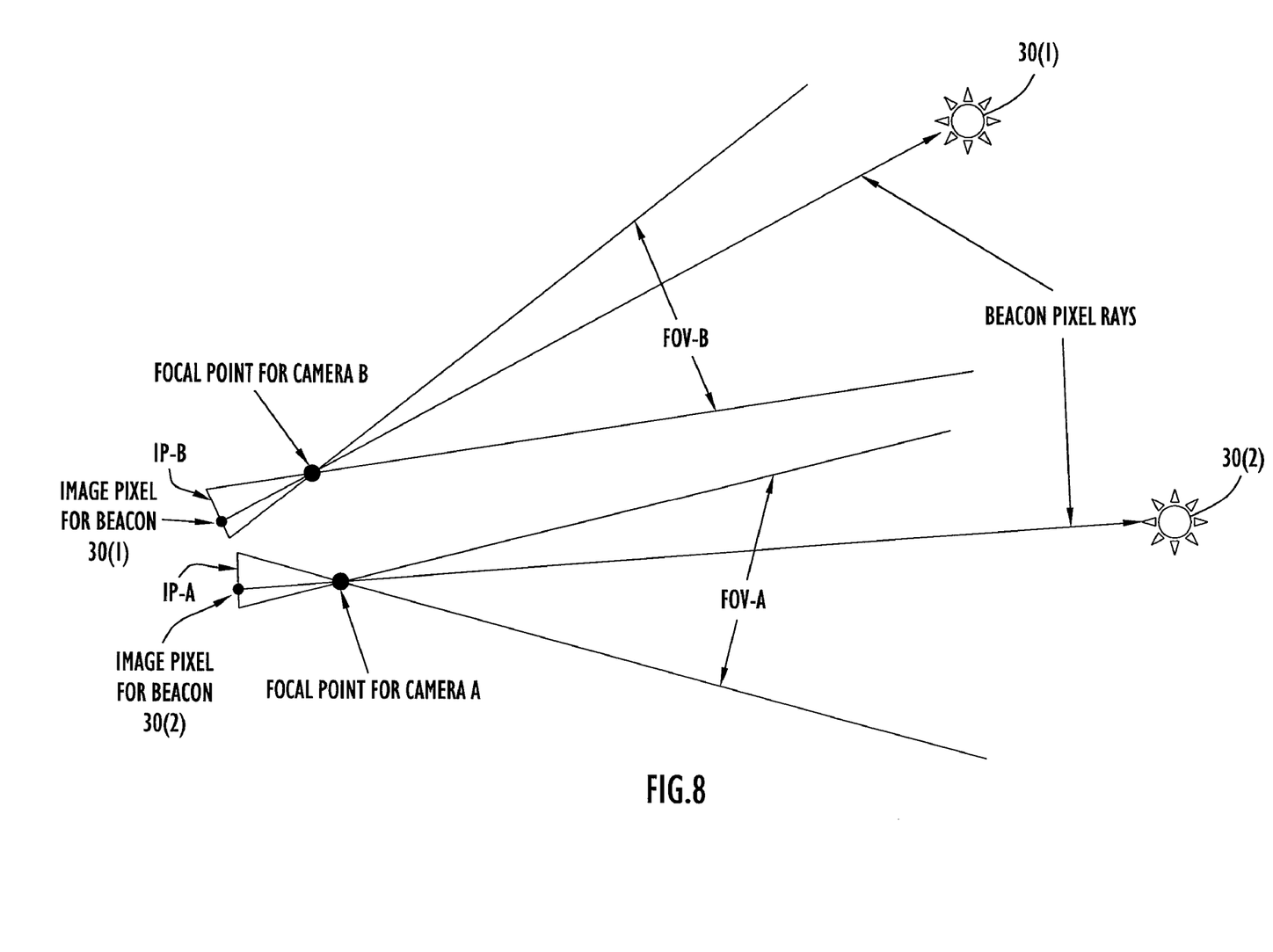
FIG. 8 is a schematic diagram illustrating the meaning of the pixels shown in FIG. 7 according to the present invention.

FIG. 8 illustrates the meaning of the pixel data derived from the images captured by two cameras, camera A and camera B, mounted on a vehicle. Camera A has an angular field-of-view (FOV)-A and camera B has an angular FOV-B. Optical beacon 30(2) is within the FOV of camera A and as a result when camera A is triggered to capture images, optical beacon 30(2) will produce an image pixel in the image plane (IP)-A for camera A. Similarly, optical beacon 30(1) is within the FOV of camera B and when camera B is triggered to capture images, optical beacon 30(1) will produce an image pixel in the image plane IP-B for camera B.

Figure 9:
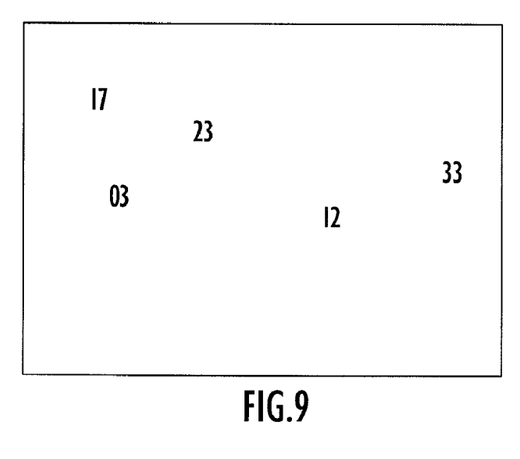
FIG. 9 illustrates the associations or matches assigned to the beacon pixels shown in FIG. 7 according to the techniques of the present invention.

Turning back to FIG. 5, next at 330, the beacon pixel locations derived from the difference frame are associated or matched to actual beacons in the beacon database according to the closest (tracked) beacons for previous "difference" frames. That is, beacon pixel positions from prior difference frames have already been associated with an actual beacon in the beacon database. At 330 first beacon match data is generated that represents the associations that can be made based on closest beacons from difference frames at previous position update cycles. FIG. 9 illustrates numeric identifiers being associated or assigned to each beacon pixel in the difference frame shown in FIG. 7. As long as the beacon pixels for a current position update cycle are at only slightly different positions than the positions of beacon pixels for a previous update cycle, then they may easily be associated to actual beacons by virtue of the beacon associations made at the prior update cycle. However, when the first difference frame is analyzed, it will not be possible to associate beacon pixels to actual beacons based on prior update cycles.

Figure 10:
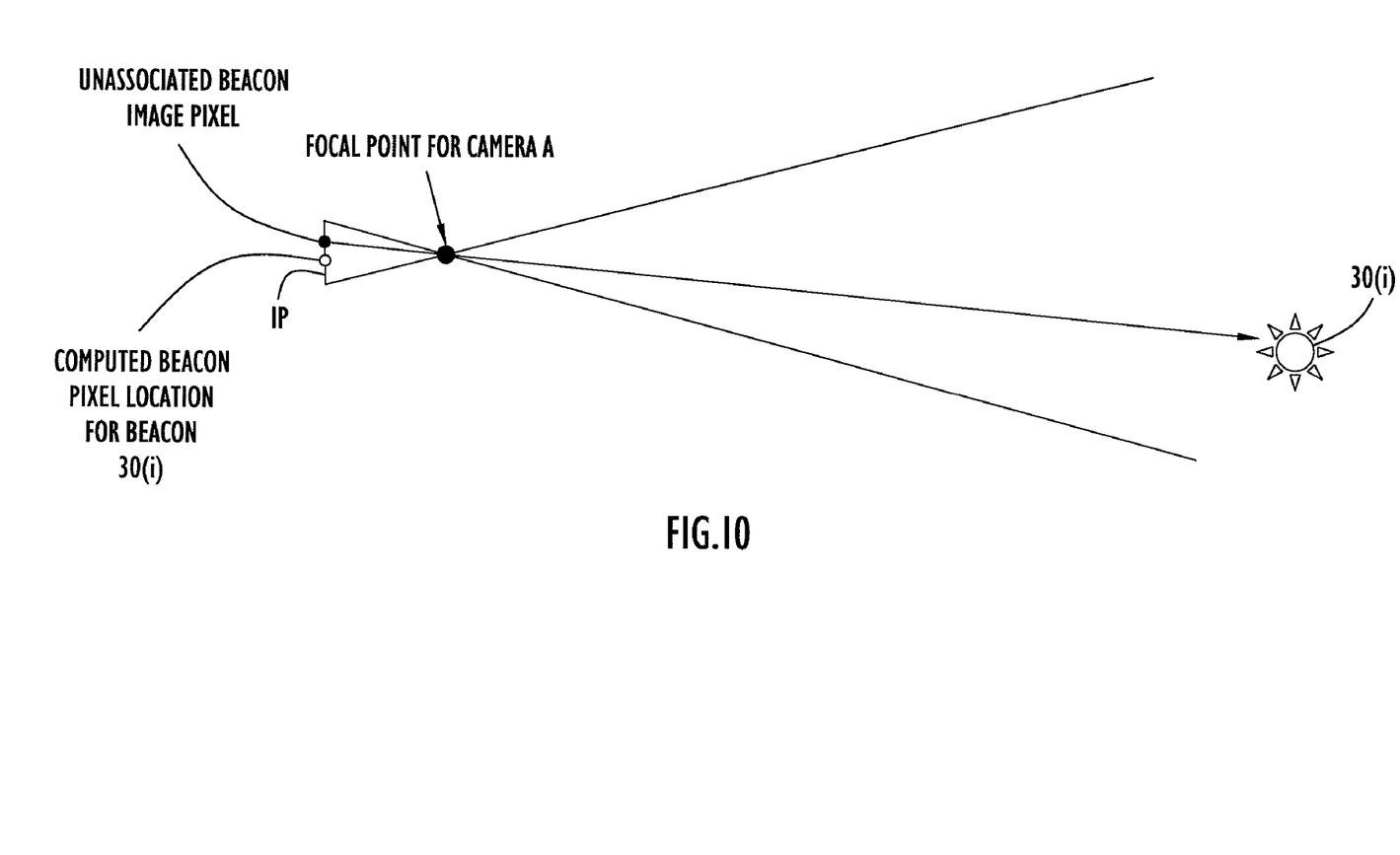
FIG. 10 is a schematic diagram illustrating how beacon positions can be tracked over successive position update cycles.

When a beacon pixel location cannot be associated with an actual beacon pixel from associations made at prior update cycles (because the beacon pixel locations are too far from beacon pixel locations at prior update cycles or because it is the first position update cycle), then at 340, three-dimensional ray intersection techniques are used to associate the beacon pixel location with a beacon in the beacon database. Reference is now made to FIG. 10 for an illustration of the computation at 340. In this case, an unassociated beacon pixel is produced on the IP of a camera. Based on the pixel location of the unassociated beacon pixel, the unassociated beacon image pixel is associated to beacon light source 30($i$) because the beacon image pixel is determined to be close to a computed theoretical position in the image plane given the approximate vehicle position (from prior update cycles or from the navigation sub-system), camera orientation and position of beacon 30($i$) in the beacon database. At 340, second beacon match data is generated that represents the associations made for those pixel locations that are matched using the three-dimensional pixel to beacon ray intersection technique.

Referring back to FIG. 5, next at 350, the position and orientation of the vehicle are computed for the current position update cycle. Since the position and orientation of each camera relative to the position and orientation of the vehicle are known, a single solution for the position and orientation of the vehicle will have associated with it a sum of errors between (a) the observed image pixel rays (derived from the beacon pixel positions) and (b) the theoretical rays derived from the calculated camera positions and orientation to the locations of the beacons stored in the beacon database. Thus, by minimizing this error, it is possible to compute an estimated position and orientation of the vehicle. For example, a least squares fit solution minimizes this error according to the minimum summation of squared deviations between rays (or alternatively, deviations between pixel locations on the image plane). Association of the observed beacon orientations with their actual surveyed locations stored in the beacon database allows the position of the vehicle to be calculated through standard triangulation and the dead reckoning error to be reset to zero. Thus, in essence, the vehicle position and orientation is derived from the first beacon match data (produced at 330) and the second beacon match data (produced at 340). Only two beacons need to be identified in order to triangulate the vehicle's position, but additional beacon observations increase the accuracy of the computation.

At 360, the current velocity is calculated based on the position computation made in 350, the position at a prior position update cycle and the duration between position update cycles. Velocity is computed in terms of ground speed and direction. The velocity may be "smoothed" similar to GPS computations by average over recent position changes of the vehicle.

At 370, the updated vehicle position and velocity, together with the frame-pair time for the position update cycle, are sent to the navigation sub-system in the vehicle.

Figure 11:
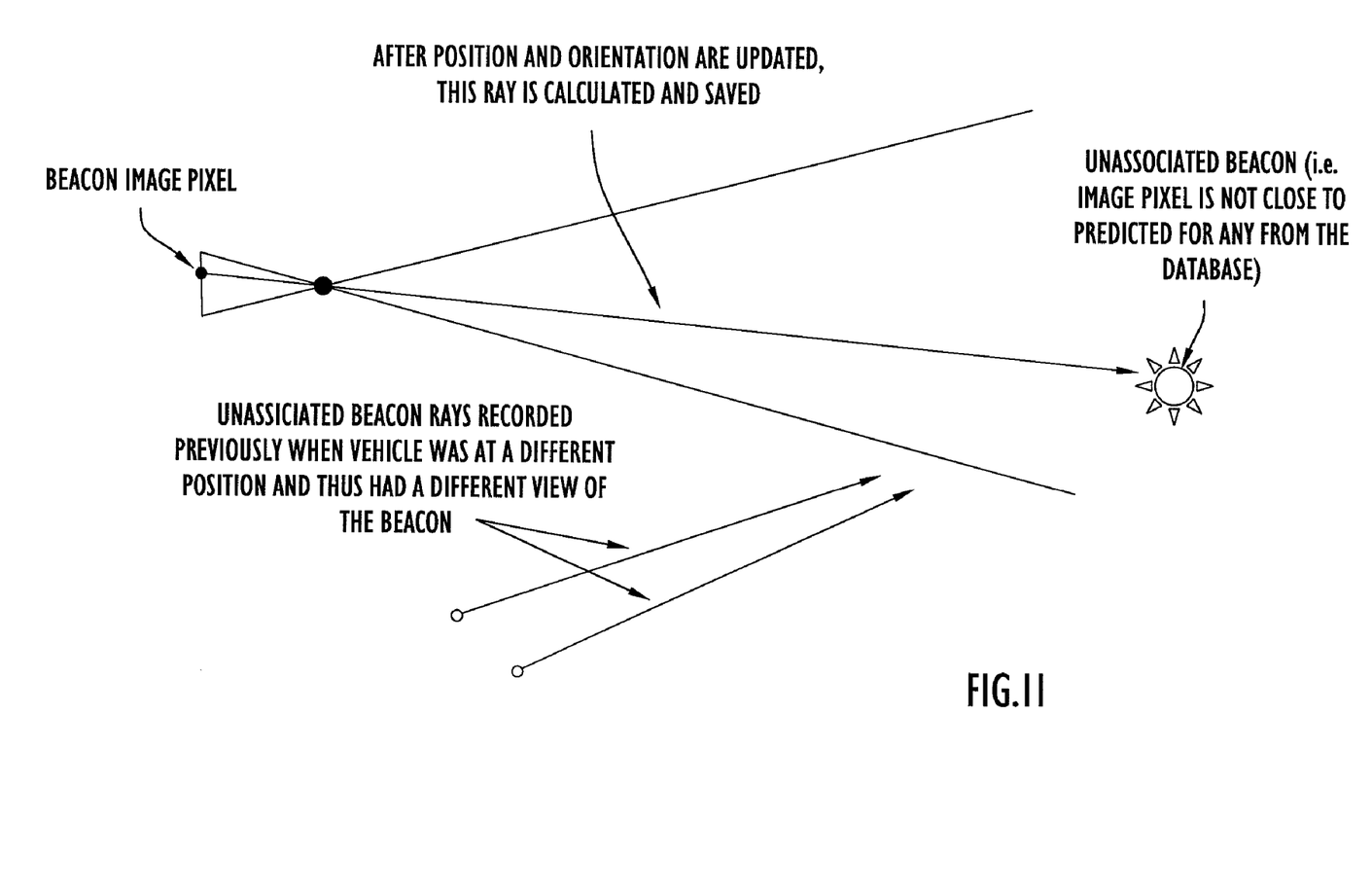
FIG. 11 is a schematic diagram illustrating a self-surveying feature for beacons that are new or not otherwise represented by data stored in the vehicle, according to still another embodiment of the present invention.

At 380, an optional self-survey function may be performed. Reference is now also made to FIG. 11. It is possible that beacons may be placed in the field of operation after the device is already deployed such that the information on one or more beacons is not contained in the beacon database stored in the vehicle. In this case, when a beacon pixel is identified but cannot be matched or associated with beacon pixel data for difference frames for prior position update cycles (at 330) and cannot be matched to data in the beacon database (340), then data for such an completely unassociated beacon pixel is stored. After the position and orientation for the update cycle in which a completely unassociated beacon pixel is found, an intersection ray is calculated and stored. Over time, that is, accumulated over multiple position update cycles, data for multiple unassociated beacon rays derived from images captured at multiple different positions and orientations of the vehicle are compared with each other to determine if several beacon rays are pointing to the same position in space according to the triangulation of multiple beacon rays that were recorded from significantly different view angles, even though that point in space does not match with a beacon in the beacon database. If so, then data is added to the beacon database for any new self-surveyed beacons from a position derived from the unassociated beacon rays and the position and orientation of the vehicle when those unassociated beach rays were computed and stored. In this way, new beacons can be self-surveyed by the vehicle.

Thus, if the self-survey function shown at 380 is employed, it is not necessary to survey-in the position of the beacons. That is, a vehicle may be initialized in a field of operation with an arbitrary starting position or a position that is determined by other means (e.g., GPS), and the beacons in the field of operation can be self-surveyed thereafter. As the vehicle moves about, new beacons will come into the vehicle's field-of-view and those beacons can then be self-surveyed as well. Thus, a few beacons can be rapidly deployed and then the vehicle can self-survey other beacons that are "dropped" into the field of operation after the vehicle is in the field of operation. For example, a vehicle (robot) may be air-dropped into a hostile or inaccessible territory, use GPS for initial position determination and then use the recently dropped beacons for precise navigation outside of reception coverage of GPS satellites.

The functions shown at 302 through 370 (and optionally 380) are repeated at each position update cycle.

The system and method of the present invention provides for an inexpensive navigation system for indoor and outdoor applications. The positioning system need not be integrated with the vehicle's navigation sub-system so that the vehicle can be totally autonomous.

As indicated above, the system and method can work with other navigational systems, such as GPS, by fusing its positioning data with GPS positioning data. Dead reckoning can be achieved between landmark observations using odometry, inertial navigation systems, or any other technique that can calculate relative motion. Location position sensing and obstacle avoidance may be implemented concurrently using conventional machine vision and LIDAR sensor, for example.

The applications for the system and method according to the present invention are any application for which vehicles, such as robots, are used, including but not limited to line of office or hospital delivery robots, home assistance to elderly or handicapped, landscape maintenance, farming, mining, construction as well as military applications. Vehicles that use the techniques described herein can perform missions that require sub 6-inch positioning accuracy indoors, outdoors in cities, in forests, near structures, inside partially enclosed stadiums, caves, and other situations where a GPS-based solution is ineffective.

Still another example involves cave navigation. In cave navigation, a robotic vehicle may deploy landmark beacons of the type described herein as it moves into the cave and then surveys the beacons as it moves away from them. Alternatively, two robotic vehicles working in tandem can reuse the beacons as they proceed through long tunnel systems. One robotic vehicle may carry the light beacons and the other may carry a video-based survey system, and where the two robots do not move at the same time. In a dark cave, visible, non-blinking light beacons may be used such that the image frame subtraction method may not be necessary.

Still another variation is to determine the range (and position) of the landmark beacons with a sensor, such as a LIDAR sensor, in order to more accurate triangulation position computations. Once the orientation to each beacon is determined, a ranging sensor could be directed at the landmark beacon. The beacon landmarks may be integrated with a reflective target to facilitate a ranging technique such as LIDAR.

The system and methods described herein may be embodied in other specific forms without departing from the spirit or essential characteristics thereof. The foregoing embodiments are therefore to be considered in all respects illustrative and not meant to be limiting.

What is claimed is:

1. A method for landmark navigation of a vehicle, comprising:
   a. storing data in the vehicle representing locations of each of a plurality of optical beacons in a field of operation, wherein each optical beacon emits or reflects an optical signal at a predetermined blink frequency and with a 50% duty cycle and such that the plurality of optical beacons are not synchronized;
   b. during a position update cycle:
      i. capturing a pair of image frames in the field of operation with at least one imaging device on the vehicle, wherein capturing comprises capturing the pair of image frames such that a time interval separating the capture of the image frames in the pair is equal to one-half of a blink period corresponding to the predetermined blink frequency of the optical beacons, and the time of capture for each image in the pair of image frames coincides with emission or reflection by a different set of optical beacons;
      ii. generating data representing a difference frame between the two image frames in the pair of image frames;
      iii. identifying pixel locations of optical beacons in the difference frame; and
      iv. deriving a position and orientation of the vehicle from data representing pixel locations of optical beacons in the difference frame and from the stored data representing the location of each of the optical beacons in the field of operation.

2. The method of claim 1, and further comprising emitting light at said predetermined blink frequency from a light source on the vehicle so as to illuminate an optical beacon, and wherein capturing comprises capturing a pair of image frames with one of the image frames including light reflected by an optical beacon on which light from said light source is incident.

3. The method of claim 1, wherein one or more of the optical beacons comprises a light source that emits an optical signal at said predetermined blink frequency.

4. The method of claim 1, wherein (iv) deriving comprises, for a first difference frame during a first position update cycle, matching pixel locations of optical beacons in the difference frame to actual optical beacons from the stored data representing the locations of each of the optical beacons.

5. The method of claim 4, wherein matching comprises, for difference frames subsequent said first difference frame during position update cycles after the first position update cycle, associating pixel locations of optical beacons in the difference frames to actual optical beacons based on data for closest matched beacon pixel locations determined from difference frames at a previous position update cycle, and generating first beacon match data representative thereof.

6. The method of claim 5, wherein (iv) deriving comprises, during position update cycles after the first position update cycle, for those pixel locations of optical beacons in the difference frames that cannot be matched to actual optical beacons from the difference frame at a previous position update cycle, determining matches to actual optical beacons from the stored data representing the locations of each of the optical beacons, and generating second beacon match data representative thereof.

7. The method of claim 6, wherein generating the second beacon match data comprises computing a three-dimensional pixel to beacon ray intersection based on a position of the vehicle as of a most recent position update cycle, orientation of the imaging device on the vehicle and the stored data representing locations of each of the optical beacons.

8. The method of claim 6, wherein (iv) deriving comprises computing position and orientation of the vehicle for a position update cycle based on the first beacon match data and second beacon match data.

9. The method of claim 8, wherein computing position and orientation of the vehicle comprises minimizing a summation of errors for the three-dimensional pixel to beacon ray intersections represented by the second match data with the position of the optical beacon to which the pixel to beacon ray is matched in the stored data of positions of the optical beacons.

10. The method of claim 6, wherein when a beacon pixel cannot be matched to an actual optical beacon in the stored data, then further comprising storing data for three-dimensional rays for beacon pixels identified over multiple position update cycles at different positions of the vehicle, and analyzing data for three-dimensional rays accumulated over time to determine when several three-dimensional rays point to the same position in space so as to store data for a new optical beacon at that position.

11. A landmark navigation system for a vehicle, comprising:
   a. a data storage device that stores data representing a location of each of a plurality of optical beacons in a field of operation, wherein each optical beacon emits or reflects an optical signal at a predetermined blink frequency and with a 50% duty cycle and such that the plurality of optical beacons are not synchronized;
   b. at least one imaging device that captures images in a field of view from the vehicle in the field of operation; and
   c. a controller connected to the storage device and the at least one imaging device, wherein for each of a plurality of position update cycles, the controller controls the at least one imaging device to capture a pair of image frames such that a time interval separating the capture of the image frames in the pair is equal to one-half of a blink period corresponding to the predetermined blink frequency of the optical beacons and the time of capture for each image in the pair of image frames coincides with emission or reflection by a different set of optical beacons, processes image data for the pair of images frames to generate a difference frame between the two image frames in the pair of image frames, and analyzes the difference frame in order to derive a position and orientation of the vehicle based on the stored data representing the location of each of the optical beacons in the field of operation.

12. The system of claim 11, and further comprising a light source on the vehicle that emits light at said predetermined blink frequency, and wherein the imaging device captures a pair of image frames with one of the image frames including light reflected by an optical beacon on which light from said light source is incident.

13. The system of claim 12, and comprising a plurality of imaging devices, each imaging device being associated with a corresponding one of a plurality of light sources.

14. The system of claim 11, wherein one or more of the optical beacons comprises a light source that emits an optical signal at said predetermined blink frequency.

15. The system of claim 11, wherein the controller analyzes a first difference frame during a first position update cycle to match pixel locations of optical beacons in the difference frame to actual optical beacons from the stored data representing the locations of each of the optical beacons.

16. The system of claim 15, wherein the controller analyzes difference frames subsequent said first difference frame during position update cycles after the first position update cycle, to associate pixel locations of optical beacons in the difference frames to actual optical beacons based on data for closest matched beacon pixel locations determined from difference frames at a previous position update cycle, and generates first beacon match data representative thereof.

17. The system of claim 16, wherein during position update cycles after the first position update cycle, and for those pixel locations of optical beacons in the difference frames that cannot be matched to actual optical beacons from the difference frame at a previous position update cycle, the controller determines matches to actual optical beacons from the stored data representing the locations of each of the optical beacons, and generates second beacon match data representative thereof.

18. The system of claim 17, wherein when a beacon pixel cannot be matched to an actual optical beacon in the stored data, the controller stores data for three-dimensional rays for beacon pixels identified over multiple position update cycles at different positions of the vehicle, and analyzes the data for three-dimensional rays accumulated over time to determine when several three-dimensional rays point to the same position in space so as to store data for a new optical beacon at that position.

19. A method for determining a position of the vehicle based on an optical signal having a predetermined blink frequency and with a 50% duty cycle that is emitted or reflected by each of a plurality of optical beacons positioned in a field of operation of the vehicle and such that the plurality of optical beacons are not synchronized, comprising:

storing data in the vehicle that represents the actual location of one or more of the optical beacons in the field of operation;

generating data representing a difference frame between two image frames captured from the vehicle such that a time interval separating the capture of the two image frames is equal to one-half of a blink period of the optical signal and the time of capture for each image in the pair of image frames coincides with emission or reflection by a different set of optical beacons;

identifying pixel locations of optical beacons in the difference frame; and computing a position and orientation of the vehicle and from said stored data and from data representing pixel locations of optical beacons in the difference frame.

20. The method of claim 19, and further comprising emitting light at said predetermined blink frequency from a light source on the vehicle so as to illuminate an optical beacon, and capturing the two image frames with one of the image frames including light reflected by an optical beacon on which light from said light source is incident.

21. The method of claim 19, wherein one of more of the optical beacons comprises a light source that emits an optical signal at said predetermined blink frequency, and further comprising capturing the two image frames with an imaging device on the vehicle.

22. A tangible computer readable medium storing instructions that, when executed by a computer, cause the computer to determine a position of the vehicle based on an optical signal having a predetermined blink frequency and with a 50% duty cycle that is emitted or reflected by each of a plurality of optical beacons positioned in a field of operation of the vehicle and such that the plurality of optical beacons are not synchronized, the instructions cause the computer to perform operations comprising:

storing data in the vehicle that represents the actual location of one or more of the optical beacons in the field of operation;

generating data representing a difference frame between two image frames captured from the vehicle such that a time interval separating the capture of the two image frames is equal to one-half of a blink period of the optical signal and the time of capture for each image in the pair of image frames coincides with emission or reflection by a different set of optical beacons;

identifying pixel locations of optical beacons in the difference frame; and computing a position and orientation of the vehicle and from said stored data and from data representing pixel locations of optical beacons in the difference frame.

23. The tangible computer readable medium of claim 22, wherein the instructions that cause the processor to perform said computing comprise instructions that cause the processor to, for a first difference frame during a first position update cycle, match pixel locations of optical beacons in the difference frame to actual optical beacons from the stored data representing the locations of each of the optical beacons, and for difference frames subsequent said first difference frame during position update cycles after the first position update cycle, associate pixel locations of optical beacons in the difference frames to actual optical beacons based on data for closest matched beacon pixel locations determined from difference frames at a previous position update cycle, and generate first beacon match data representative thereof.

24. The tangible computer readable medium of claim 23, wherein the instructions that cause the processor to compute comprise instructions that cause the processor to, during position update cycles after the first position update cycle, for those pixel locations of optical beacons in the difference frames that cannot be matched to actual optical beacons from the difference frame at a previous position update cycle, determine matches to actual optical beacons from the stored data representing the locations of each of the optical beacons, to generate second beacon match data representative thereof and to compute said position and orientation of the vehicle for a position update cycle based on the first beacon match data and second beacon match data.

25. The tangible computer readable medium of claim 23, wherein the instructions that cause the processor to compute the second beacon match data comprise instructions that cause the processor to compute a three-dimensional pixel to beacon ray intersection based on a position of the vehicle as of a most recent position update cycle, orientation of the imaging device on the vehicle and the stored data representing locations of each of the optical beacons.

26. The tangible computer readable medium of claim 23, and further comprising instructions that cause the processor to, when a beacon pixel cannot be matched to an actual optical beacon in the stored data, store data for three-dimensional rays for beacon pixels identified over multiple position update cycles at different positions of the vehicle, and analyze data for three-dimensional rays accumulated over time to determine when several three-dimensional rays point to the same position in space so as to store data for a new optical beacon at that position.

* * * * *